US008888124B2

(12) United States Patent
Iftinca

(10) Patent No.: US 8,888,124 B2
(45) Date of Patent: Nov. 18, 2014

(54) CHILD CAR SEAT CARRIERS

(75) Inventor: Liviu Ioan Iftinca, Chicago, IL (US)

(73) Assignee: Kolcraft Enterprises, Inc., Chicago, IL (US)

( * ) Notice: Subject to any disclaimer, the term of this patent is extended or adjusted under 35 U.S.C. 154(b) by 53 days.

(21) Appl. No.: 13/363,240

(22) Filed: Jan. 31, 2012

(65) Prior Publication Data

US 2012/0193892 A1 Aug. 2, 2012

Related U.S. Application Data

(60) Provisional application No. 61/438,117, filed on Jan. 31, 2011.

(51) Int. Cl.
 B62B 1/00 (2006.01)
 B62B 9/28 (2006.01)
 B62B 7/14 (2006.01)
(52) U.S. Cl.
 CPC . *B62B 7/142* (2013.01); *B62B 9/28* (2013.01); *B62B 7/145* (2013.01)
 USPC ........................................ 280/647; 280/47.38
(58) Field of Classification Search
 USPC ......... 280/658, 642, 47.38, 30, 474, 650, 644
 See application file for complete search history.

(56) References Cited

U.S. PATENT DOCUMENTS

| 2,478,512 A | 8/1949 | Taylor |
| 2,689,135 A | 9/1954 | Toohey |
| 2,751,232 A | 6/1956 | Sundberg |
| 2,812,949 A | 11/1957 | Munro |
| 3,184,249 A | 5/1965 | Shone |
| 3,421,774 A | 1/1969 | Patterson |
| 3,459,435 A | 8/1969 | Garner |
| 3,873,116 A | 3/1975 | Perego |
| 3,901,528 A | 8/1975 | Miyagi |
| 4,065,177 A | 12/1977 | Hyde et al. |
| 4,191,397 A | 3/1980 | Kassai |
| 4,272,100 A | 6/1981 | Kassai |
| 4,371,206 A | 2/1983 | Johnson, Jr. |
| 4,529,219 A | 7/1985 | Shamie |
| 4,545,613 A | 10/1985 | Martel et al. |
| 4,614,454 A | 9/1986 | Kassai |
| 4,620,711 A | 11/1986 | Dick |
| 4,632,421 A | 12/1986 | Shamie |
| 4,634,177 A | 1/1987 | Meeker |
| 4,678,196 A | 7/1987 | Van Steenburg |
| 4,685,688 A * | 8/1987 | Edwards .......................... 280/30 |
| 4,725,071 A | 2/1988 | Shamie |
| 4,736,959 A | 4/1988 | Van Steenburg |
| 4,786,064 A | 11/1988 | Baghdasarian |
| 4,832,354 A | 5/1989 | LaFreniere |

(Continued)

FOREIGN PATENT DOCUMENTS

GB 2179897 A 3/1987

*Primary Examiner* — Hau Phan
(74) *Attorney, Agent, or Firm* — Hanley, Flight & Zimmerman, LLC

(57) ABSTRACT

Car seat carriers are disclosed. An example child car seat carrier includes a frame and a clamp to hold a child car seat to the frame. The clamp includes a ratcheting joint to prevent movement of the clamp toward a released position while enabling movement of the clamp toward a locked position. The example child car seat carrier further includes a manual actuator to selectively release the clamp to move toward the open position.

22 Claims, 14 Drawing Sheets

(56) References Cited

U.S. PATENT DOCUMENTS

| | | | |
|---|---|---|---|
| 4,834,403 A | 5/1989 | Yanus et al. | |
| 4,896,894 A | 1/1990 | Singletary | |
| 5,104,134 A | 4/1992 | Cone | |
| 5,121,940 A | 6/1992 | March | |
| 5,133,567 A | 7/1992 | Owens | |
| 5,244,292 A | 9/1993 | Wise | |
| 5,499,831 A | 3/1996 | Worth et al. | |
| 5,544,904 A | 8/1996 | Maher | |
| 5,601,297 A | 2/1997 | Stein | |
| 5,772,235 A | 6/1998 | Espenshade | |
| 5,794,951 A | 8/1998 | Corley et al. | |
| 5,961,180 A | 10/1999 | Greger et al. | |
| 6,189,914 B1 | 2/2001 | Worth et al. | |
| 6,302,412 B1 | 10/2001 | Worth et al. | |
| 6,409,205 B1 * | 6/2002 | Bapst et al. | 280/642 |
| 6,550,801 B1 | 4/2003 | Newhard | |
| 6,572,134 B2 * | 6/2003 | Barrett et al. | 280/650 |
| 6,626,452 B2 | 9/2003 | Yang et al. | |
| 6,641,164 B2 | 11/2003 | Wood et al. | |
| 6,802,514 B2 | 10/2004 | Worth et al. | |
| D502,896 S | 3/2005 | Pullam | |
| 6,880,850 B2 * | 4/2005 | Hsia | 280/642 |
| 6,923,467 B2 | 8/2005 | Hsia | |
| 7,017,921 B2 | 3/2006 | Eros | |
| 7,070,197 B2 | 7/2006 | Chen | |
| 7,090,291 B2 | 8/2006 | Birchfield | |
| 7,278,652 B2 * | 10/2007 | Riedl et al. | 280/642 |
| 7,377,537 B2 | 5/2008 | Li | |
| 7,464,957 B2 | 12/2008 | Worth et al. | |
| 7,600,775 B2 * | 10/2009 | Chen et al. | 280/650 |
| 7,694,996 B2 | 4/2010 | Saville et al. | |
| 7,712,765 B2 | 5/2010 | Chen et al. | |
| 7,753,398 B2 | 7/2010 | Yang | |
| 8,376,375 B2 * | 2/2013 | Mival et al. | 280/47.38 |
| 2004/0173997 A1 | 9/2004 | Voll | |
| 2005/0127640 A1 | 6/2005 | Worth et al. | |
| 2006/0131841 A1 | 6/2006 | Huang | |
| 2007/0085304 A1 | 4/2007 | Yeh | |
| 2009/0033066 A1 | 2/2009 | Saville et al. | |
| 2010/0078916 A1 | 4/2010 | Chen | |

* cited by examiner

CHILD CAR SEAT CARRIERS

RELATED APPLICATIONS

This patent claims the benefit of U.S. Provisional Patent Application Ser. No. 61/438,117, entitled "Infant Car Seat Carriers," which was filed on Jan. 31, 2011, and is incorporated herein by reference in its entirety.

FIELD OF THE DISCLOSURE

This disclosure relates generally to child care products, and, more particularly, to child car seat carriers.

BACKGROUND

Child car seat carriers are often used to hold, carry, and/or transport child car seats. Child car seat carriers generally include a frame and wheels. A child car seat may be removably coupled to the frame to enable a caregiver to transfer a child in a child car seat from, for example, a vehicle to the child car seat carrier without having to remove the child from the child car seat.

Figure 1:
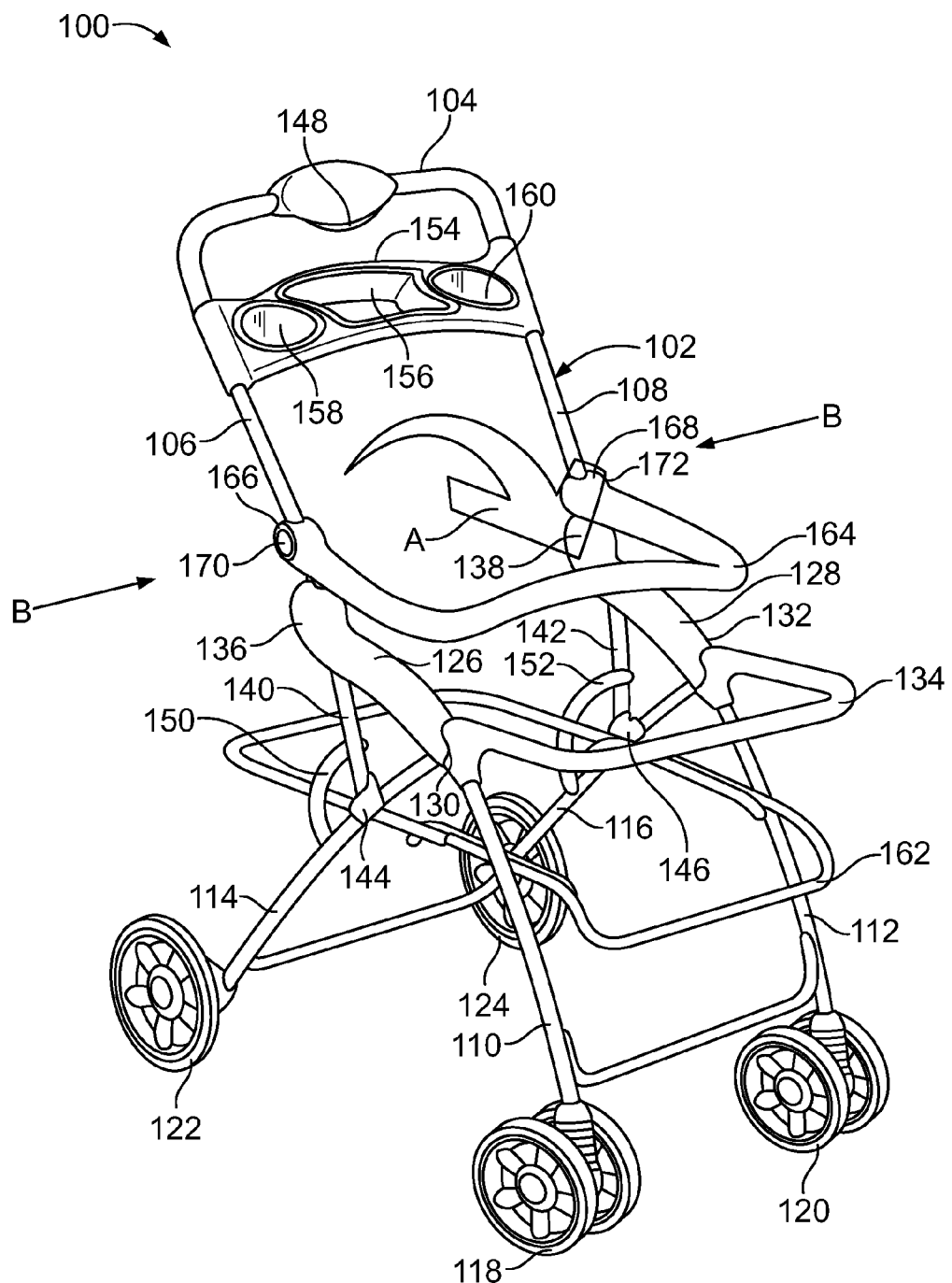
FIG. 1 is a perspective view of an example child car seat carrier including an example security bar.

Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Child car seat carriers are stroller-like devices used to hold, carry and/or transport a child car seat (e.g., an infant car seat). Child car seat carriers have many of the structural components and functionality of child strollers, but typically do not include a seat for a child occupant. Child car seat carriers enable a caregiver to transfer an infant from, for example, a child car seat in a vehicle to the child car seat carrier without having to remove the child from the child car seat.

Some example child car seat carriers disclosed herein include a frame to support a child car seat. An example bar is coupled to the frame via a joint. The example joint includes a release and enables the bar to be positioned in a plurality of positions between a first position and a second position. The example joint also enables the bar to move toward the second position without actuation of the release, but prevents the bar from moving toward the first position unless the release is actuated.

Other example child car seat carriers disclosed herein includes a frame to support a child car seat and a bar pivotably coupled to the frame via a joint. The joint includes a first gear and a second gear, which is urged into engagement with the first gear. Engagement of the gears prevents movement of the first gear in a first direction about an axis of rotation of the first gear while enabling movement of the first gear in a second direction opposite the first direction. Some such example child car seat carriers further include a release button. Actuation of the release button causes the second gear to disengage the first gear to enable the first gear to move about the axis of rotation in the first direction. In such examples, the bar coupled to the joint moves with the first gear to hold the child car seat to the frame.

Other example child car seat carriers disclosed herein include a frame and a clamp to hold a child car seat to the frame. The clamp includes a joint to prevent movement of the clamp toward an open position while enabling movement of the clamp toward a closed position. The example child car seat carrier also includes a release. Actuation of the release enables movement of the clamp toward the open position.

In examples disclosed herein, when in an open or raised position, the example bar or clamp does not hold the child car seat in place and facilitates insertion or removal of the child car seat from the frame. In the closed or lowered position, the bar or clamp is locked over the child car seat and securely holds the child car seat in place on the child car seat carrier. Example child car seat carriers disclosed herein can accommodate and secure a variety of types (e.g., shapes, sizes, makes, models, etc.) of child car seats.

FIGS. 1-4 show an example child car seat carrier 100 constructed in accordance with the teachings of this disclosure to support and secure a child car seat. In the illustrated example, the child car seat carrier 100 includes a frame 102 that has a u-shaped handle 104 extending across a width of the child car seat carrier 100. The handle enables a caregiver to grasp and steer the example child car seat carrier 100. The handle 104 of the illustrated example is coupled to elongated arms 106 and 108 of the frame 102 on left and right sides of the example child car seat carrier 100. In some examples, the handle 104 includes two separate handle portions on each of the right and left sides of the example child car seat carrier 100 that are not directly connected to each other.

The frame 102 of the example child car seat carrier 100 of FIG. 1 also includes two front legs 110 and 112, two rear legs 114 and 116, front rollers or wheels 118 and 120 and rear rollers or wheels 122 and 124. The illustrated example child car seat carrier 100 has four front wheels arranged in two sets of paired wheels 118 and 120 and two rear wheels 122 and 124. Other example child car seat carriers include any other number of wheels. For example, some example child car seat carriers include a single front wheel on each side of the child car seat carrier. In some examples, the front legs 110 and 112 converge together to a single wheel or a centrally located pair of wheels. In some examples, the rear wheels 122 and 124 may include sets of paired wheels.

The example frame 102 of FIGS. 1-4 includes a first side bar 126 and a second side bar 128. Each of the front legs 110 and 112 is pivotably coupled to a respective one of the first side bar 126 or the second side bar 128. The rear legs 114 and 116 are also pivotably coupled to a respective one of the first side bar 126 or the second side bar 128. Thus, the side bars 126 and 128, the front legs 110 and 112 and the rear legs 114 and 116 form first and second folding joints 130 and 132. A first ends of the side bars 126 and 128 are coupled to a front napper bar 134. The example napper bar 134 of FIG. 1 is a u-shaped bar that spans across a width of a front of the child car seat carrier 100 from a first end of the first side bar 126 to a first end of the second side bar 128. In other examples, the napper bar 134 have other shapes and/or sizes. The napper bar 134 may be pivotably or non-pivotably coupled to the first side bar 126 and the second side bar 128. The napper bar 134 of the illustrated example provides a support on which a portion of a car seat may be mounted.

A second end of each of the side bars 126 and 128 is pivotably coupled to a respective one of the arms 106 and 108 to form second folding joints 136 and 138. In the illustrated example, the arms 106 and 108 and side bars 126 and 128 are supported on a respective one of the rear legs 114 and 116 by respective arm extensions or struts 140 and 142. The struts 140 and 142 include first ends that are coupled to a respective one of the side bars 126 and 128 and second ends that releasably engage a receptacle 144 and 146 on each of the rear legs 114 and 116. In some examples the arms 106 and 108 and the struts 140 and 142 are integral.

The handle 104 of the illustrated example includes a release latch 148. When a user actuates the release latch 148, the frame 102 unlocks and is free to move between an open, deployed or in-use position (FIGS. 1-3) to a closed, folded or stored position (FIG. 4). The release button 148 of the illustrated example operates to overcome a spring force and pulls two pins via respective cables disposed in each of the arms 106 and 108 from engagement with the receptacles 144 and 146 (in this example located on the rear legs 114 and 116), thereby unlocking the frame 102. The user can then apply a downward force on the handle 104 to cause the unlocked frame 102 to collapse to the position shown in FIG. 4. In other examples, the pins are located in the side bars 126 and 128 and or the release latch 148 is coupled by two releases latches located on lower portions of the arm 106 and 108.

The struts 140 and 142 of the illustrated example are also coupled to the rear legs 114 and 116 via lower side links 150 and 152. The example lower side links 150 and 152 of the illustrated example are curved. In other examples, the lower side links 150 and 152 have other shapes. The lower side links 150 and 152 provide a pivotal connection between the struts 140 and 142 and rear legs 114 and 116 and enable the handle 104 to be lowered as shown in FIG. 4 to reduce the form factor of the folded example child car seat carrier 100.

The example child car seat carrier 100 of FIGS. 1-4 also includes accessory features such as, for example, a storage shelf or parent tray 154 beneath the handle 104 to carry beverages and/or other items. The parent tray 154 of the illustrated example comprises a central compartment 156, and beverage holders 158 and 160 on each side of the central compartment 156. The example child car seat carrier 100 of FIGS. 1-4 also includes a lower basket frame 162. In some examples, a basket is suspended from the lower basket frame 162.

Figure 2:
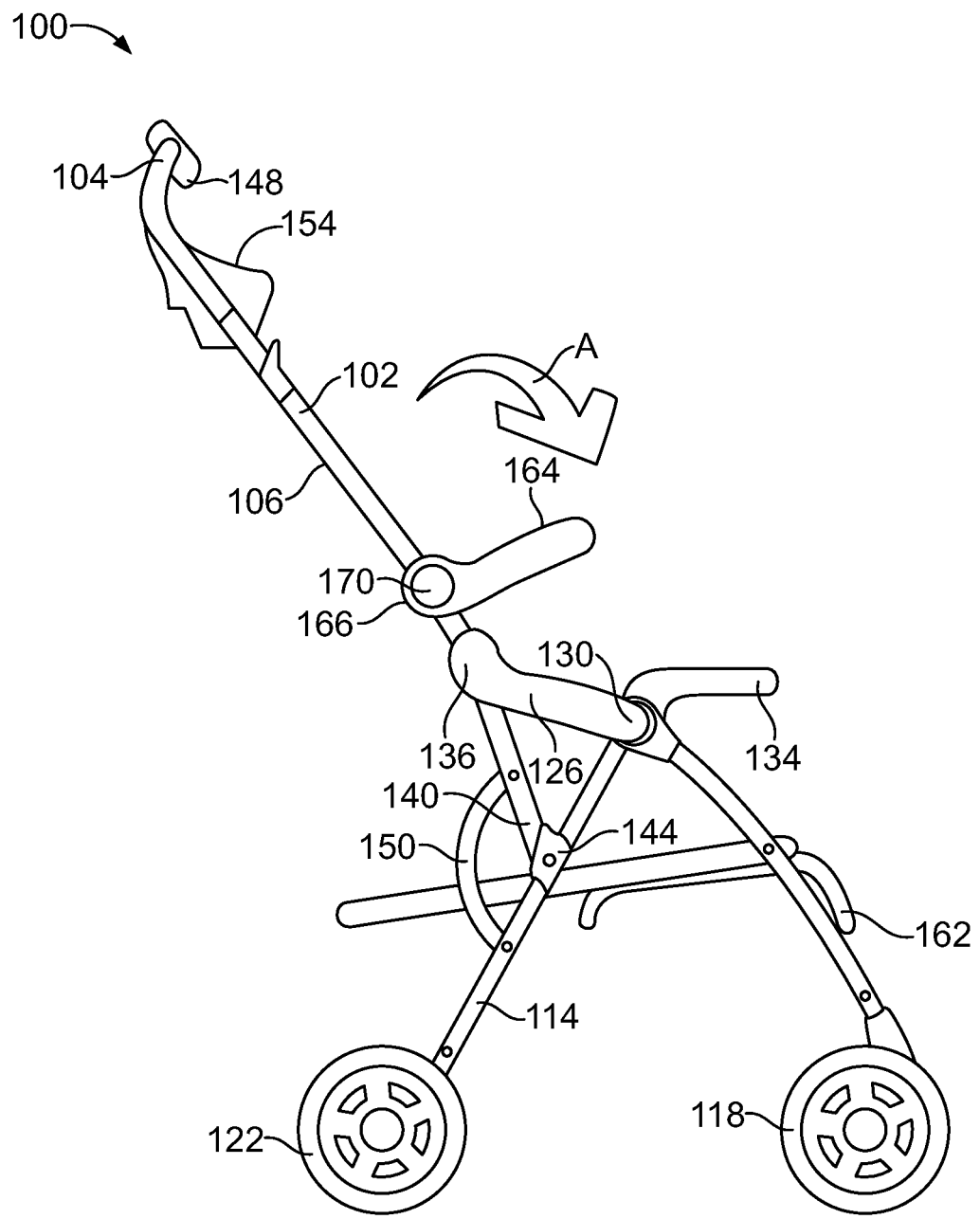
FIG. 2 is a side view of the example child car seat carrier of FIG. 1.
Figure 3:
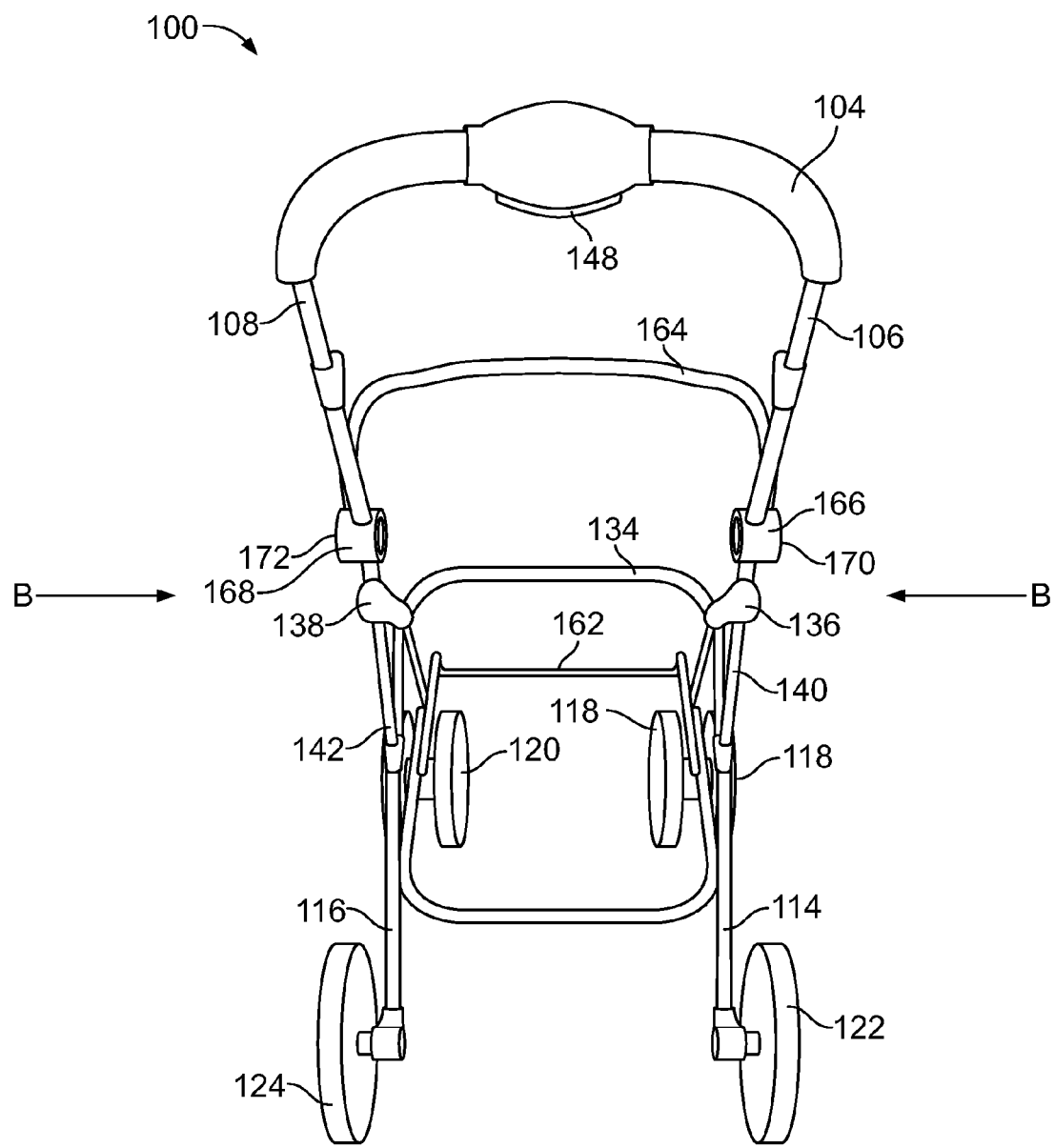
FIG. 3 is a rear view of the example child car seat carrier of FIG. 1.
Figure 4:
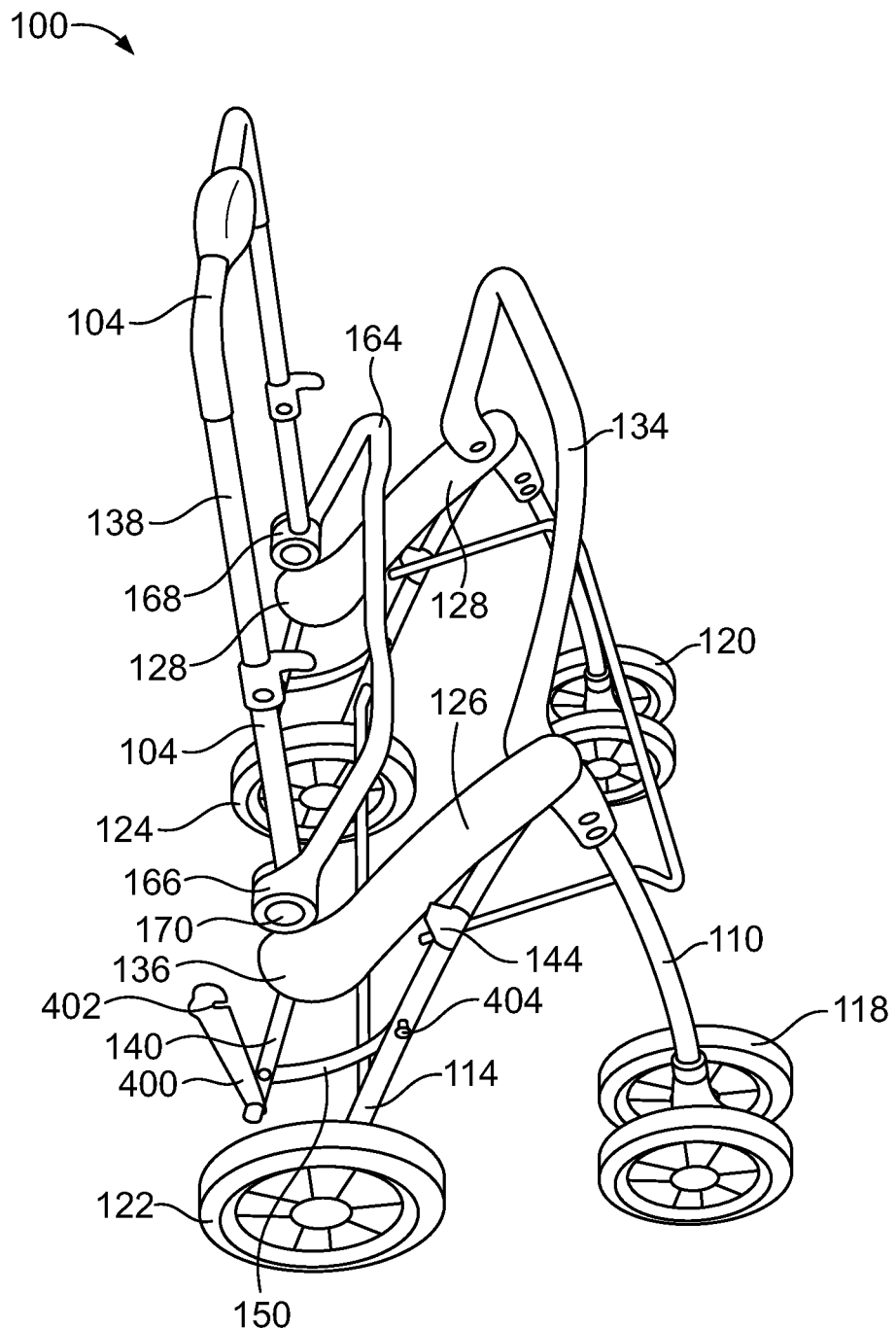
FIG. 4 is a side view of the example child car seat carrier of FIG. 1 in a folded position.

As shown in FIGS. 1-4, the example child car seat carrier 100 includes an example security bar 164 to releasably secure or clamp a child car seat to the frame 102. In the illustrated example, the security bar is pivotably coupled to the arms 106 and 108. The example security bar 164 of FIGS. 1-4 is a u-shaped bar that spans from the arm 106 to the other arm 108 across a width of the child car seat carrier frame 102. As illustrated in FIGS. 1-3, the security bar 164 is rotated downward in the direction of the arrow A to a lowered, locked or closed position. As described in greater detail below, the security bar 164 may be positioned in any of a plurality of locked, lowered or closed positions.

In the illustrated example, the security bar 164 is coupled to the arms 106 and 108 via a first security bar joint 166 and a second security bar joint 168. Example implementations of the security bar joints 166 and 168 are shown in greater detail in FIGS. 9-12. The example first and second security bar joints 166 and 168 are substantially identical but oriented in opposite directions. The example security bar joints 166 and 168 each include a release button 170 and 172, which may be actuated (e.g., depressed) in a direction of arrows B (i.e., inward toward a center of the example child car seat carrier 100). In the illustrated example, to move the example security bar 164 toward the raised or open position, both of the release buttons 170 and 172 must be actuated. Thus, in the illustrated example, the security bar 164 is not released when only one of the side buttons 170 and 172 is pressed. Instead, both release buttons 170 and 172 are pressed to release the example security bar 164, thereby providing added security against accidental release (e.g., if one of the example security bar joints 166 and 168 is depressed accidentally by a child, etc.). In other examples, however, only one of the example security bar joints 166 and 168 locks the security bar 164 in position, thereby enabling a caregiver to unlock the security bar 164 with one hand. As described in greater detail below, the example security bar 164 moves freely from a raised or open position to any of a plurality of lowered, locked or closed positions without actuation of the release buttons 170 and 172.

FIG. 4 is a right side view of the example child car seat carrier 100 in a folded position. In the illustrated example of FIG. 4, the security bar 164 is in a raised position. The example child car seat carrier 100 also includes a locking latch 400 that is rotatably coupled to the frame 102. In the illustrated example, the locking latch 400 is coupled to one of the arm extensions or struts 140 and 142, and the locking latch 400 includes a notch 402 to engage a pin 404 on one of the rear legs 114 and 116. When the locking latch 400 is rotated so that the notch 402 engages the pin 404, the example child car seat carrier 100 is held or locked in the folded position.

FIGS. 5-8 depict the example child car seat carrier 100 of FIGS. 1-4 supporting and/or holding an example child car seat 500. The example child car seat 500 of FIG. 5 includes a handle 502. The handle 502 of the illustrated example child car seat 500 is wider than the example child car seat carrier 100 between the first side bar 126 and the second side bar 128. As a result, the side bars 126 and 128 support the child car seat 500 via the handle 502. The napper bar 134 of the illustrated example supports an end (e.g., a front or head end) of the child car seat 500. In some examples, the napper bar 134 engages a notch on a lower or bottom surface of the child car seat 500. The side bars 126 and 128 and the naper bar 134 of the example the frame 102, thus, cooperate to support the child car seat 500 and to prevent the child car seat 500 from falling downward from the example child car seat carrier 100.

Figure 5:
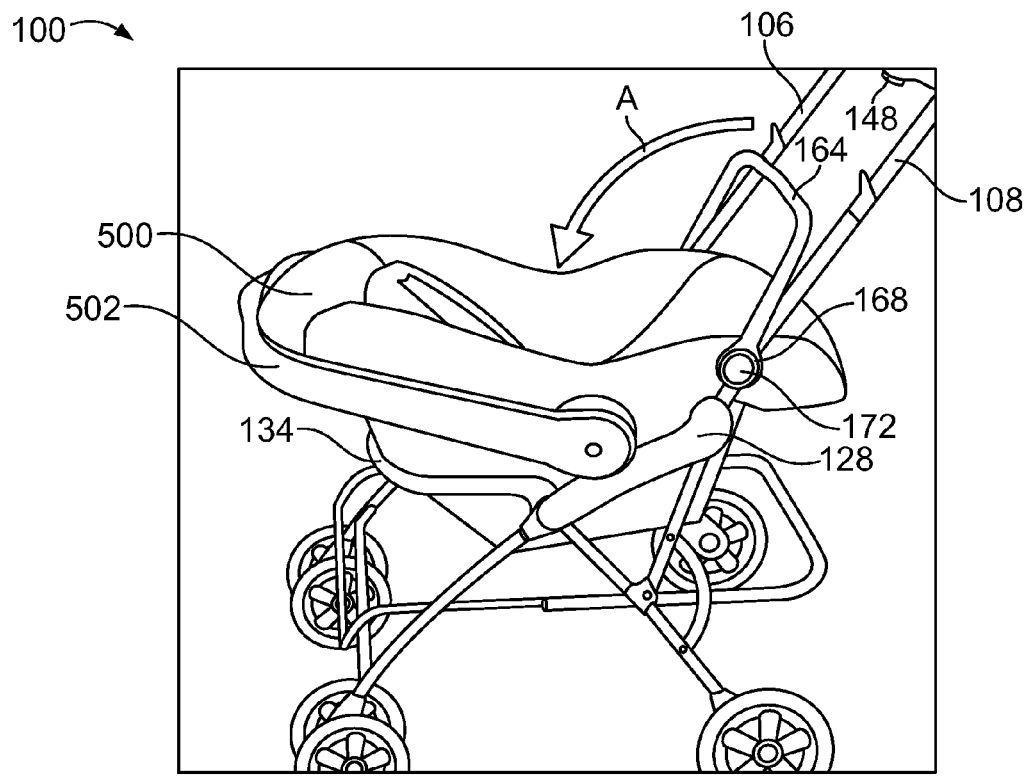
FIG. 5 is a side view of the example child car seat carrier of FIG. 1 supporting an example child car seat and with the example security bar in a raised or open position.
Figure 6:
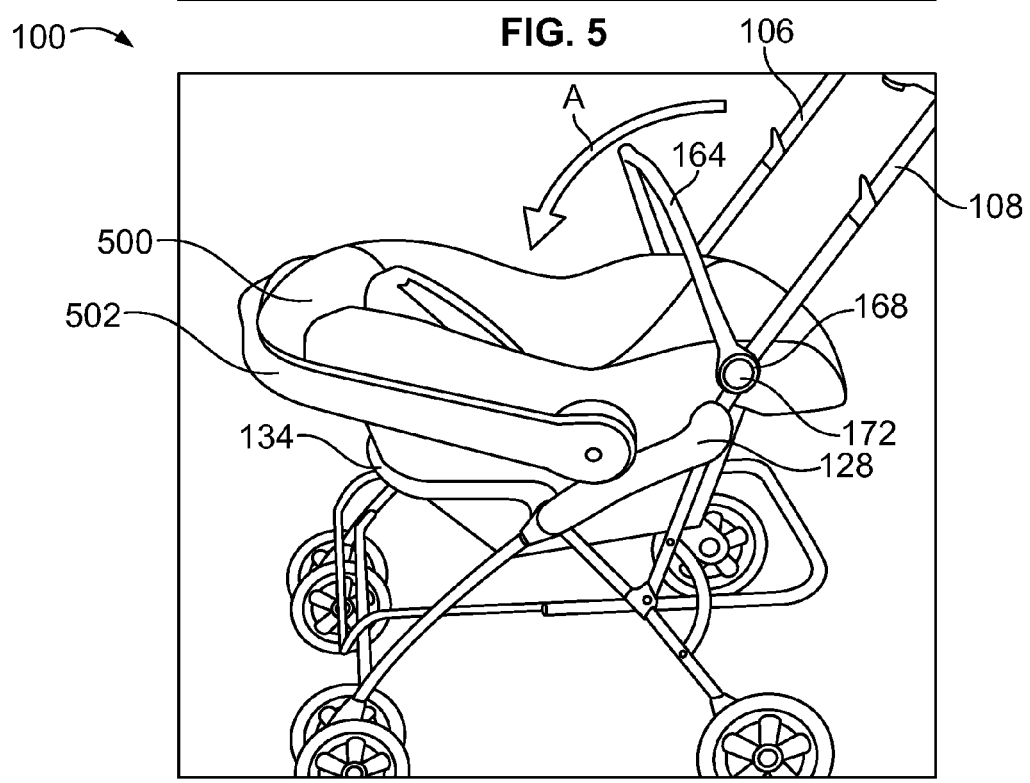
FIG. 6 is a side view of the example child car seat carrier of FIG. 5 supporting the example child car seat and with the example security bar in a semi-lowered position.
Figure 7:
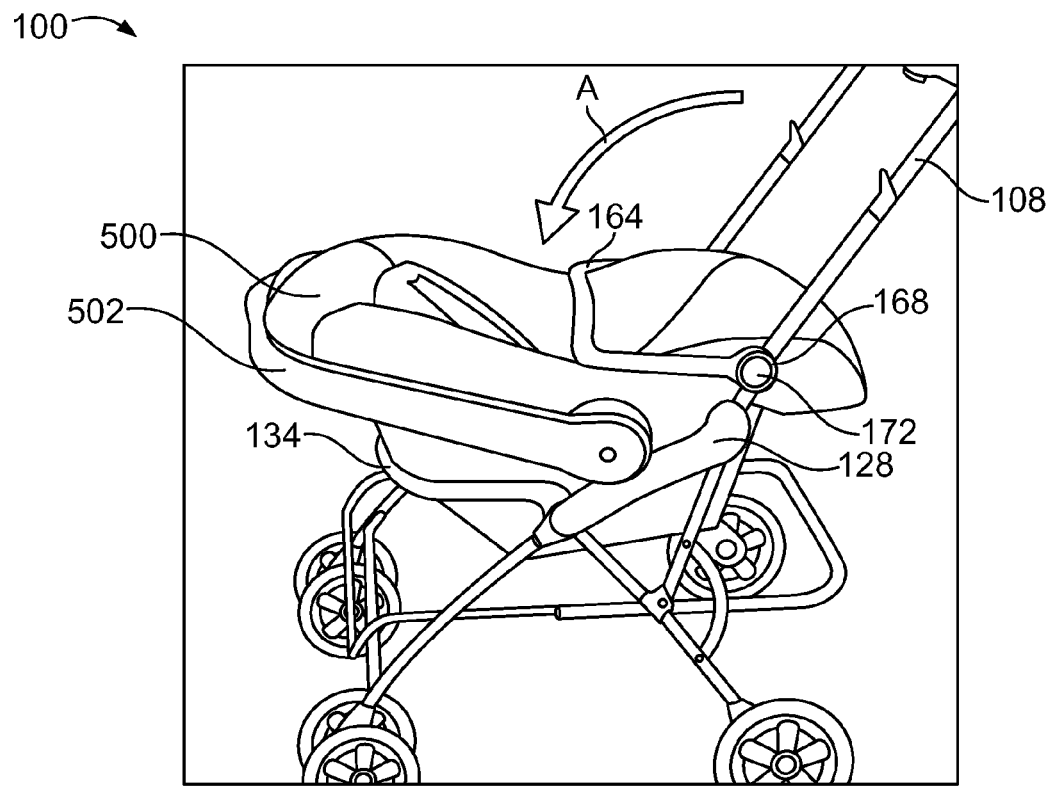
FIG. 7 is a side view of the example child car seat carrier of FIG. 5 supporting the example child car seat and with the example security bar in a lowered or closed position.
Figure 8:
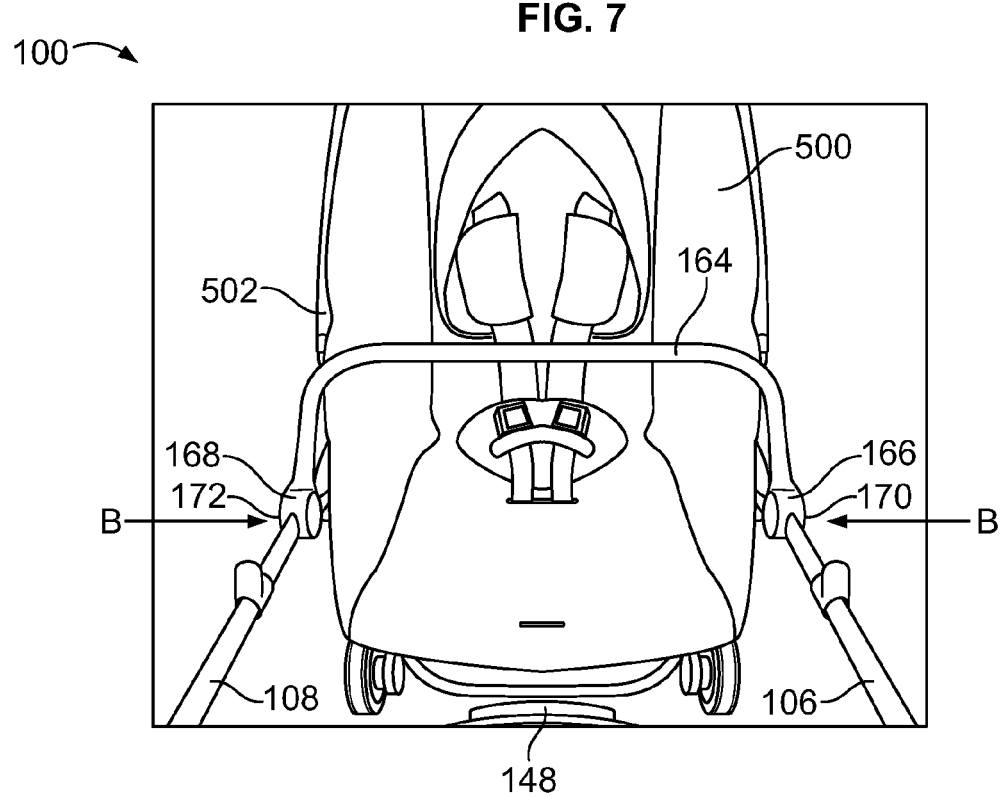
FIG. 8 is a top view of the example child car seat carrier of FIG. 7.

FIG. 5 shows the example security bar 164 in a fully raised or open position. FIG. 6 shows the example security bar 164 in a semi-lowered position. FIGS. 7 and 8 show the example security bar 164 in a fully lowered or closed position in which the child car seat 500 is secured or clamped to the frame 102. As mentioned above, the example security bar 164 is provided with two, one-way locks or ratchets that at the joints couple the bar 164 to the frame 102. As a result, for example, the security bar 164 may be moved from the position of FIG. 5 to the position in FIG. 6, or from the position in FIG. 6 to the position in FIG. 7 by imparting a force in the direction of the arrow A to move the security bar 164. However, the example security bar 164 cannot be moved from the position of FIG. 7 to the position of FIG. 5 or 6, or from the position in FIG. 6 to the position in FIG. 5 without actuating the release buttons 170 and 172. Because the example security bar 164 locks (with respect to upward movement toward the open position) in a plurality of positions, the security bar 164 is able to accommodate and hold or secure child car seats of different types (e.g., different shapes, sizes, makes, models, etc.) to the example child car seat carrier 100.

Figure 9:
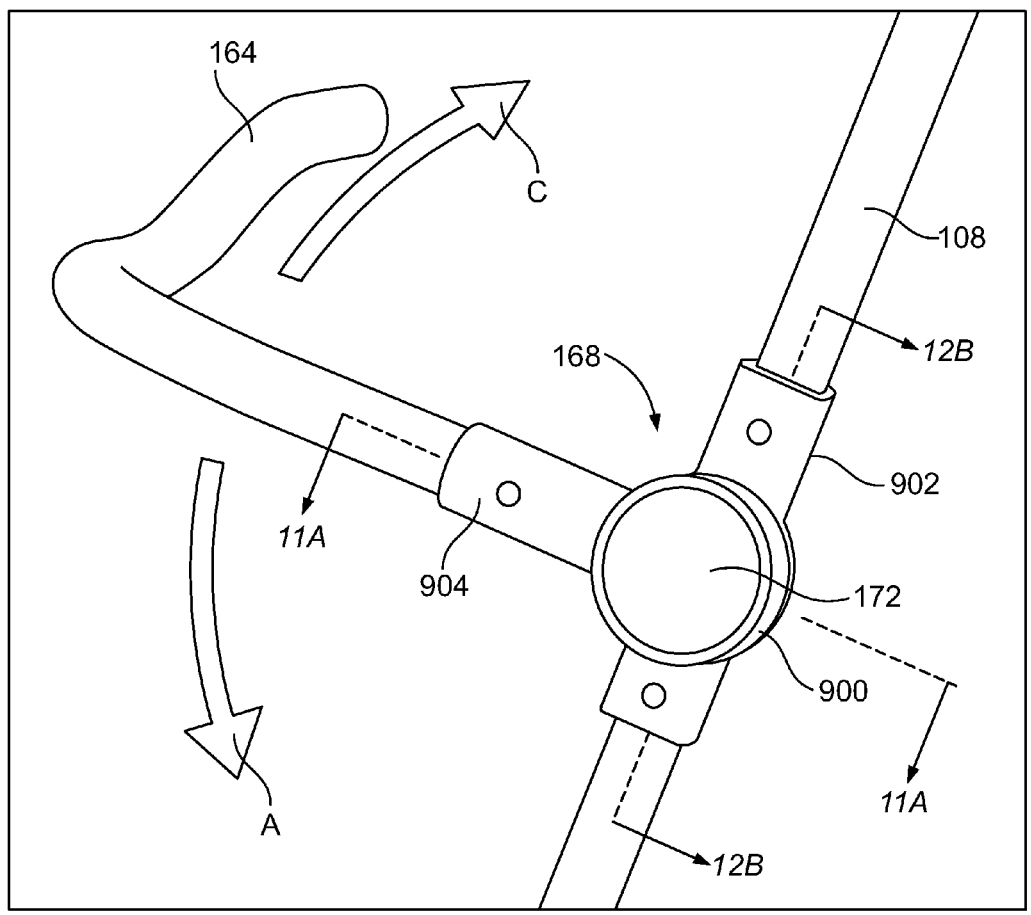
FIG. 9 is an enlarged view of an example security bar joint of the example child car seat carrier of FIGS. 1-8.

FIGS. 9-12 show the example security bar joints 166 and 168 of the example child car seat carrier 100 of FIGS. 1-8 in greater detail. FIG. 9 is an enlarged view of the example security bar joint 168. Because the joint 166 is substantially similar to joint 168, the description of joint 168 can be easily applied to the joint 166. Thus, to avoid redundancy, joint 166 is not separately described. The example security bar joint 168 includes the release button 172 coupled to a gear housing 900. The gear housing 900 is coupled to the frame 102 via a carrier frame attachment member 902 and appropriate mechanical fasteners (e.g., screws, rivets, etc.). In the illustrated example, the security joints 166 and 168 are coupled to the arms of the frame. The example gear housing 900 also includes a bar receptacle or tubular hub 904 to receive and secure a portion of the security bar 164. The bar 164 is secured to the hub via one or more mechanical fasteners.

Figure 10:
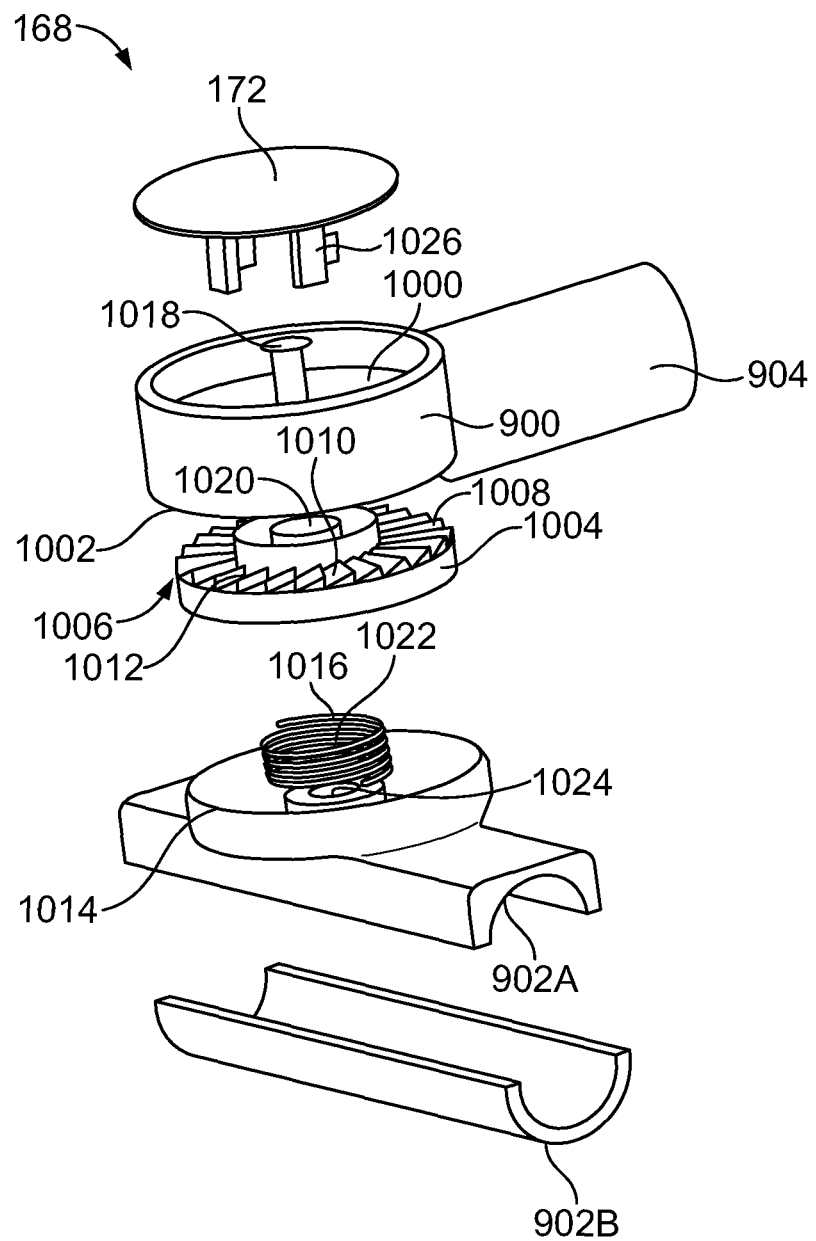
FIG. 10 is an exploded view of the example security bar joint of FIG. 9.

FIG. 10 shows an exploded view of the example security bar joint 168 of FIG. 9. The gear housing 900 defines a first cavity 1000 and a second cavity 1002. The second cavity 1002 is located on a side of the gear housing 900 opposite the first cavity 1000. The first cavity 1000 receives the release button 172. The second cavity 1002 includes a first gear 1100 (FIGS. 11 and 12) and receives at least a portion of a second gear 1004. The example second gear 1004 includes a plurality of teeth 1006 that are arranged in a circular pattern about an edge of a face 1008 of the second gear 1004 facing the first gear. In the illustrated example, the teeth 1006 of the second gear 1004 have a substantially ramp-shaped profile. Thus, each of the example teeth 1006 have a first or camming surface 1010 that is angled at a first angle relative to the face 1008 of the second gear 1004, and a second or locking surface 1012 that is angled at a second angle relative to the face 1008 of the example second gear 1004. The first angle is less than the second angle. In some examples, the second angle is substantially 90° such that the second or locking surfaces 1012 of each of the teeth 1006 are substantially parallel to an axis of rotation of the first gear. As described in greater detail below, the first gear includes teeth in a pattern corresponding to the pattern of the teeth 1006 of the second gear 1004.

The example carrier frame attachment member 902 includes a first portion 902A and a second portion 902B. The first portion of the carrier frame attachment member 902A of the illustrated example defines a third cavity 1014. The third cavity 1014 houses at least a portion of a compression spring 1016 and the second gear 1004. The first portion of the carrier frame attachment member 902A is coupled to the second portion of the carrier frame attachment member 902B via any suitable mechanical and/or chemical fasteners. In the illustrated example, the first and second portions of the carrier frame attachment members 902A and 902B are complementary components that surround a portion of the frame 102 such as, for example, one of the arms 106 and 108, to couple the example security bar joints 166 and 168 and the example security bar 164 to the frame 102.

A rivet 1018 couples and aligns the gear housing 900, the second gear 1004 and the first portion of the carrier frame attachment member 902A. When the carrier frame attachment member 900 is secured to the frame 102, the rivet 1018 also couples the gear housing 900 and the second gear 1004 to the frame 102. The rivet 1018 extends through a first aperture 1101 in the gear housing 900, a second aperture 1020 in the second gear 1004, a center 1022 of the compression spring 1016, and a third aperture 1024 in the first portion of the carrier frame attachment member 902A. The rivet 1018 provides the axis of rotation or pivot about which the gear housing 900 including the first gear and the second gear 1004 rotate during operation. In the illustrated example, the second gear 1004 is slidably coupled to the rivet 1018 to enable the second gear 1004 to move along a length of the rivet 1018 (i.e., the axis of rotation of the first gear) against or under the influence of the spring 1016.

The release button 172 of the illustrated example is housed in the first cavity 1000 over the rivet 1018. The release button 172 includes flanges or legs 1026 that extend through apertures (see FIG. 12) defined in the gear housing 900. The legs 1026 of the release button 172 engage the second gear 1004 such that depressing the release button 172 applies a force to the second gear 1004 and moves the second gear 1004 away from the first gear 1100.

Figure 11:
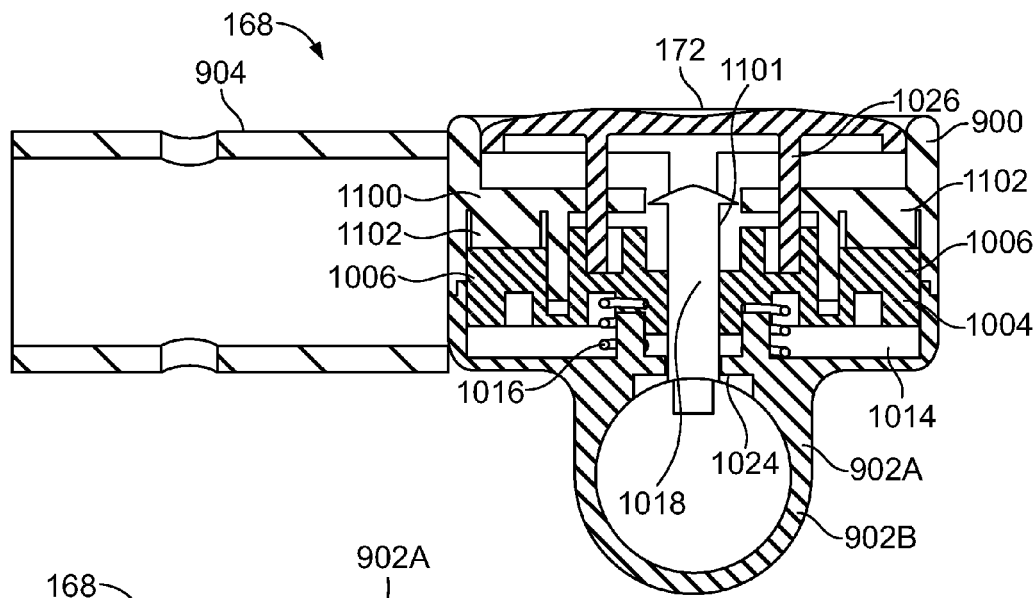
FIG. 11 is a cross-sectional view of the example security bar joint of FIG. 9 taken along the 11A-11A line.

FIG. 11 is a cross-sectional view of the example security bar joint along axis 11A of FIG. 9. In the illustrated example, the gear housing 900 and the first gear 1100 are integrally formed. The compression spring 1016 biases or urges the second gear 1004 (and, thus, the release button 172) toward the first gear 1100 to cause the second gear 1004 to engage the first gear 1100 when the release button 172 is unactuated. The first gear 1100 includes teeth 1102 in a pattern corresponding to the pattern of the teeth 1006 of the second gear 1004. The teeth 1102 of the first gear 1100 are also ramp-shaped and each include a first or camming surface and a second or locking surface. In the illustrated example of FIG. 11, the teeth 1102 of the first gear 1100 and the teeth 1006 of the second gear 1004 are aligned and enmeshed. When the second gear 1004 engages the first gear 1100 (i.e., when the release button 172 is not actuated against the force of the compression spring 1016), the teeth 1006 of the second gear 1004 engage corresponding teeth or ridges 1102 on the first gear 1100 to lock the security bar 164 against rotation in an first, upward and/or rearward direction (i.e., toward the raised or open position of FIG. 5). The first gear 1100 and the second gear 1004 may include any number of teeth and/or ridges 1006 and 1102 of any size. The number and the size of the teeth or ridges 1006 and 1102 correspond to a number of discrete positions of the example security bar 164. For example, the number of teeth 1006 of the second gear 1004 is proportional to a number of locked positions of the example security bar 164 between the raised or open position and the lowered or closed position of the security bar 164.

The surfaces 1010 and 1012 of the teeth of the second gear 1004 are oriented relative to the teeth 1102 of the first gear 1100 to enable the first gear 1100 and, thus, the example security bar 164 to rotate in a counterclockwise direction (FIG. 10) (i.e., toward the lowered or locked position) relative to the second gear 1004 while the second gear 1004 is in contact with or engaging the first gear 1100 (i.e., while the release button 172 is not actuated to counteract the force of the spring 1016). This may be thought of as a ratcheting action. For example, when a downward or forward force is applied to the example security bar 164 (i.e., in the direction of Arrow A of FIG. 10), the teeth or ridges 1102 of the first gear 1100 traverse along the first or camming surfaces 1010 of the second gear 1004. In this example, the teeth 1006 and 1102 create a racing or ratcheting noise as the example security bar 164 is moved downward or toward the closed or lowered position, which signals or indicates to the caregiver that the security bar 164 is moving from one position to another position toward the closed or lowered position.

In addition, the cammed and locking surfaces 1010 and 1212 of the example teeth 1006 of the second gear 1004 are oriented so that the first gear 1100 cannot rotate in a clockwise direction of FIG. 9 (i.e., toward the raised or open position) relative to the second gear 1004 while the example second gear 1004 is in contact with the first gear 1100. The clockwise movement of the first gear 1100 is prevented because the example second or locking surfaces 1012 of the ridges or teeth 1102 of the first gear 1100 engage the example second or locking surfaces of the teeth 1006 of the second gear 1004, and friction prevents rotation of the gears 1004 and 1100 in the clockwise direction in the orientation of FIG. 9 (i.e., toward the raised or open position of FIG. 5). In some examples, the second gear 1004 is locked against rotation relative to the first gear in both directions unless the release button 172 is actuated and, thus, may move only along the axis of rotation (i.e., toward or away from the first gear 1100). For example, the first gear 1100 may hold the second gear 1004 against movement about the axis of rotation. Thus, the example security bar 164 locks against upward movement (i.e., in the direction of the Arrow C of FIG. 9) to secure or clamp the child car seat 500 in the example car seat carrier 100.

Figure 12:
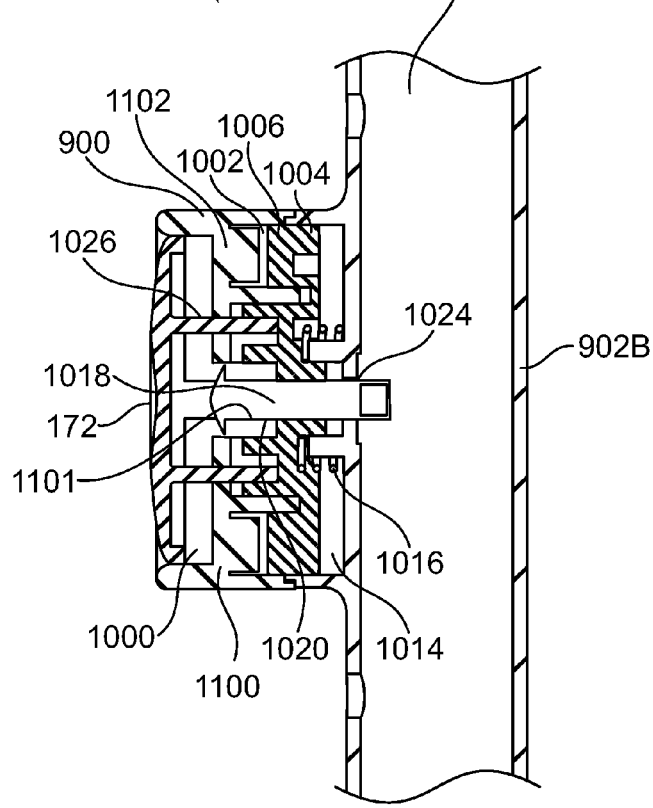
FIG. 12 is a cross-sectional view of the example joint of FIG. 9 taken along the 12B-12B line.

FIG. 12 is a cross-sectional view of the example security bar joint 168 of FIG. 9 along axis 12B. In the illustrated example, the release button 172 is actuated and the second gear 1004 is disengaged from the first gear 1100. Actuation of the release button 172 compresses the spring 1016 and moves the second gear 1004 via the flanges or legs 1026 of the release button 172 away from the first gear 1100. As a result, the second gear 1004 disengages the first gear 1100, enabling the first gear 1100 to rotate clockwise in the orientation of FIG. 9 and the security bar 164 to move toward the raised or open position.

When the security bar 164 moves upward from one of the lowered or locked positions and is in a desired position, the release button 172 is deactivated or released to cause the spring 1016 to move the second gear 1004 into engagement with the first gear 1100, thereby locking the gears 1004 and 1100 and, thus, the security bar 164 in the desired position (while permitting the downward rotating motion explained above).

FIGS. 13-17 show another example child car seat carrier 1300. Many of the features of the example child car seat carrier 1300 are the same as the examples described above and, in the interest of brevity, will not be repeated here. Thus, in these examples, the reference numbers that were used in the examples of FIGS. 1-8 are used to reference like structures. In the example child car seat carrier 1300 of FIGS. 13-17, an example security bar 1302 is coupled to the frame 102 of the example child car seat carrier 1300 at a first security bar joint 1304 and a second security bar joint 1306. In this example, the security bar joints 1304 and 1306 coincide with a first frame folding joint 1308 and a second frame folding joint 1310. That is, the security bar joints 1304 and 1306 are located adjacent the first frame folding joint 1308 and the second frame folding joint 1318. The first frame folding joint 1308 and the second frame folding joint 1310 define axes of rotation about which one or more of the arms 106 and 108, the struts 140 and 142, and the first side bar 126 and the second side bar 128 rotate with respect to one or more portions of the frame 102.

Figure 13:
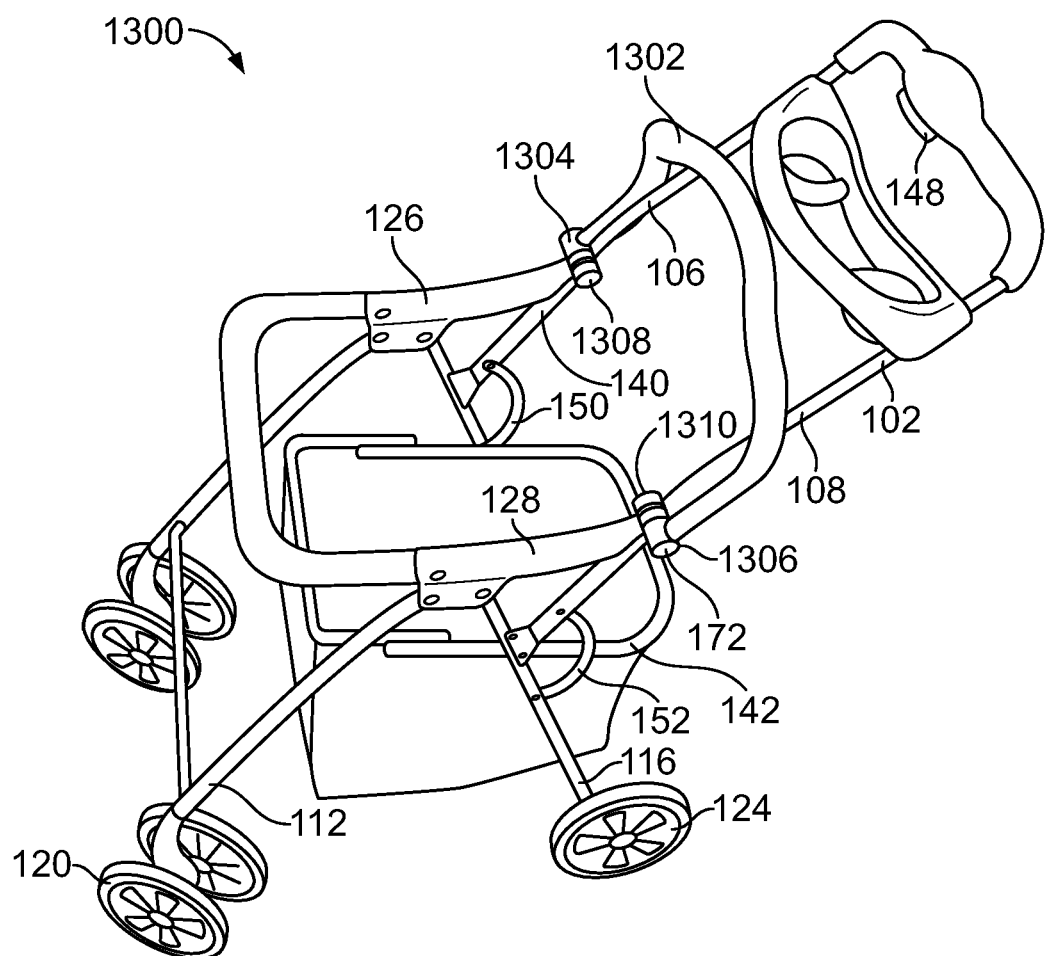
FIG. 13 is a top-side, perspective view of another example child car seat carrier with an example security bar.
Figure 14:
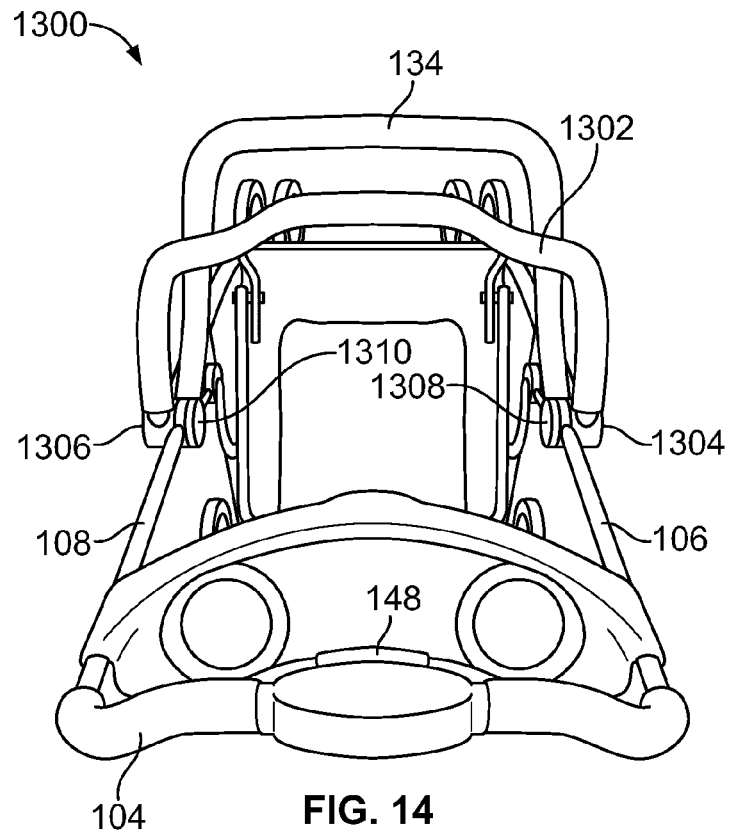
FIG. 14 is a top view of the example child car seat carrier of FIG. 13 with the example security bar in a lowered position.
Figure 15:
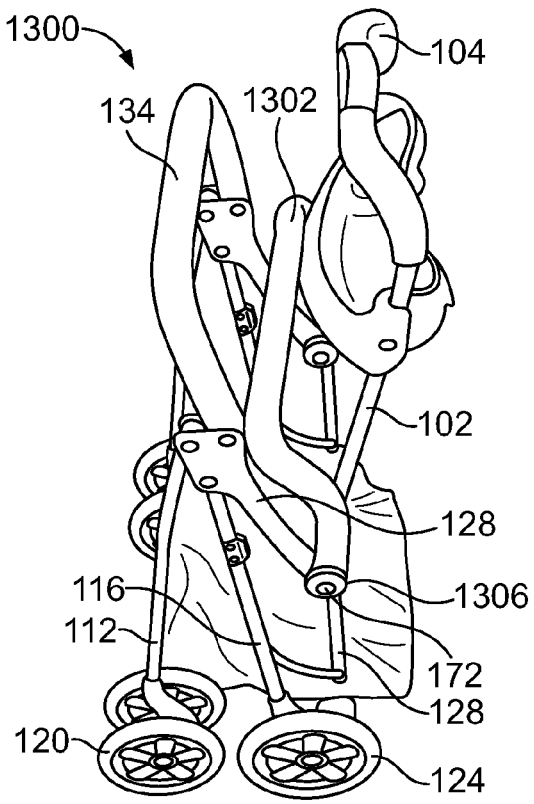
FIG. 15 is a side view of the example child car seat carrier of FIG. 13 in a folded position.

The example child car seat carrier 1300 of FIG. 13 includes a frame locking/unlocking mechanism, which includes cables operatively coupled to the release actuator 148 and extending through the arms 106 and 108 and the handle bar extensions or struts 140 and 142 without interacting with the example security bar joints 1304 and 1306. Actuation of the locking/unlocking mechanism enables a user to fold the example child car seat carrier 1300 into a folded position illustrated in FIG. 15. The example security bar joints 1304 and 1306 of this example operate the same as the example security bar joints 166 and 168 disclosed above.

Figure 16:
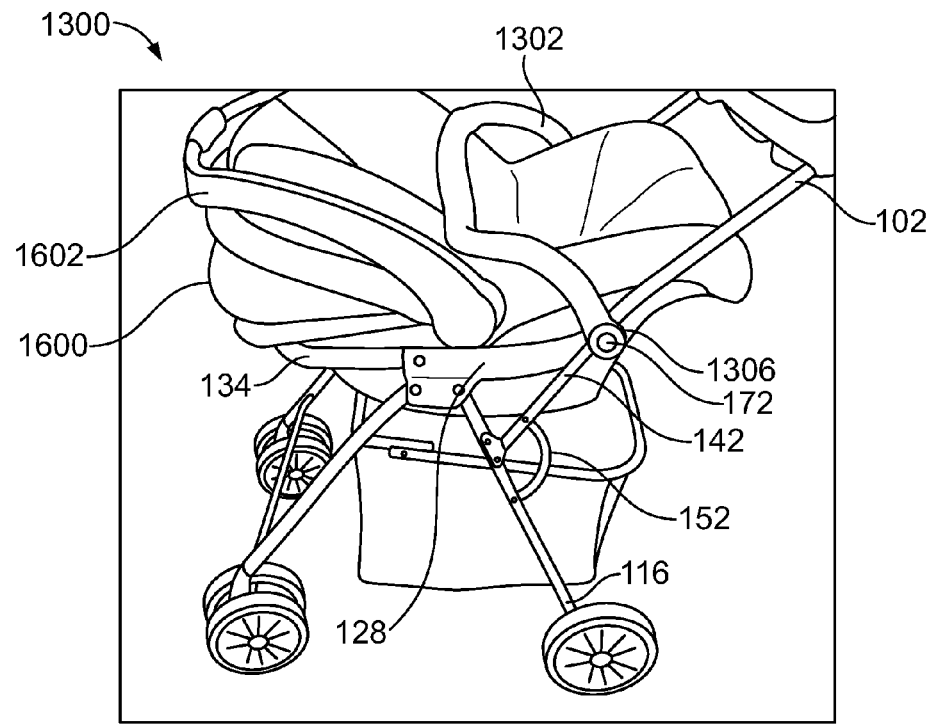
FIG. 16 is a side view of the example child car seat carrier of FIG. 13 with the example security bar in a lowered position securing an example child car seat.
Figure 17:
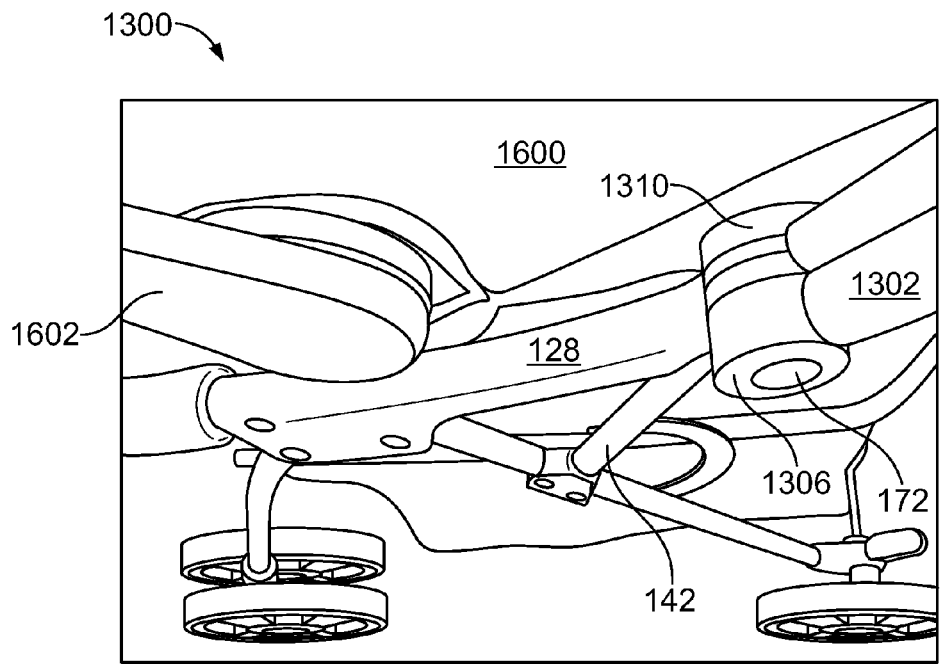
FIG. 17 is an enlarged view of a side of the example child car seat carrier and child car seat of FIG. 16.

FIGS. 16 and 17 illustrate a child car seat 1600 supported on the example child car seat carrier 1300. The child car seat 1600 is supported toward a front or head end of the child car seat 1600 by the napper bar 134 and on sides of the child car seat 1600 by the side bars 126 and 128. A handle 1602 of the example child car seat 1600 is wider than the example child car seat carrier 1300 between the first side bar 126 and the second side bar 128 so that the side bars 126 and 128 cooperate with the napper bar 134 to support the child car seat 1600 and prevent the child car seat 1600 from falling downward from the example child car seat carrier 1300.

Figure 18:
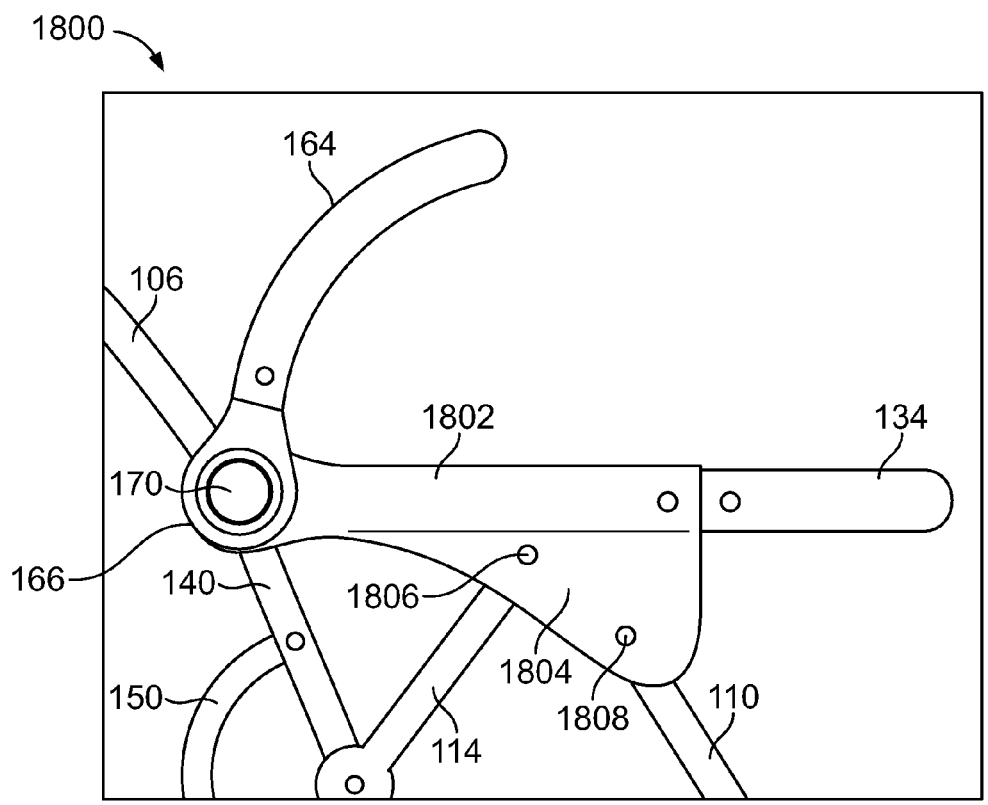
FIG. 18 illustrates another example child car seat carrier and security bar.

FIGS. 18-21 illustrate alternative example child car seat carriers 1800, 1900, 2000, 2100, respectively. In these examples, the reference numbers that were used in the examples of FIGS. 1-8 are used to reference like structures. For example, FIG. 18 shows an example child car seat carrier 1800 which includes an example substantially linear side bar 1802. The example side bar 1802 including a substantially triangularly-shaped flap 1804. In the illustrated example, the side bar 1802 extends toward a front end of the example child car seat carrier 1800 (e.g., to the right in FIG. 18). The triangular flap 1804 includes a first pivot point 1806 and a second pivot point 1808. The first pivot point 1806 forms a point of rotation for the rear leg 114 when the example child car seat carrier 1800 moves between the open and the collapsed positions. The second pivot point 1808 forms a point of rotation for the front leg 110 when the example child car seat carrier 1800 moves between the open and the collapsed positions. In some examples, the pivot points 1806 and 1808 may be non-rotatable connection points to fixedly couple the front leg 110 or the rear leg 114 to the example side bar 1802.

Figure 19:
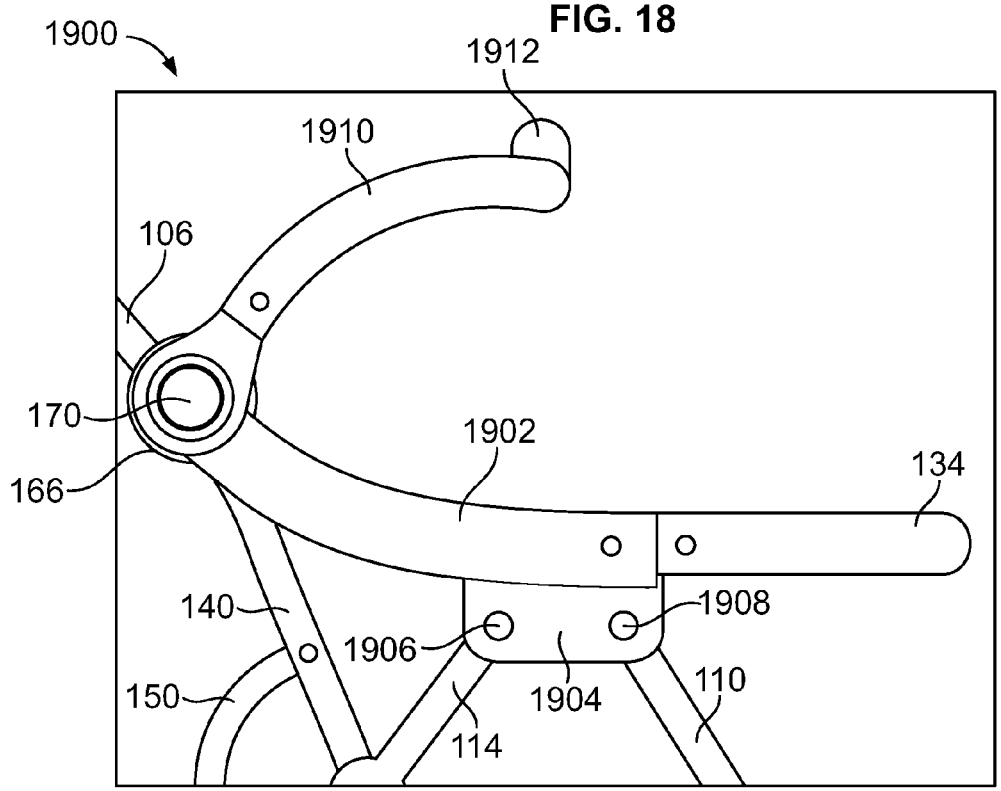
FIG. 19 illustrates another example child car seat carrier and security bar.

FIG. 19 shows an example curved side bar 1902 including a substantially rectangular-shaped flap 1904. In the illustrated example, the side bar 1902 extends toward a front end of the example child car seat carrier 1900 (e.g., to the right in FIG. 19). The rectangular flap 1904 includes a first pivot point 1906 and a second pivot point 1908. The first pivot point 1906 forms a point of rotation for the rear leg 114 when the example child car seat carrier 1900 moves between the open and the collapsed positions. The second pivot point 1908 forms a point of rotation for the front leg 110 when the example child car seat carrier 1900 moves between the open and the collapsed positions. The example child car seat carrier 1900 of FIG. 19 also includes an example security bar 1910 including a bent or raised central portion 1912 that provides more room for a child occupant when the security bar 1910 is in the lowered position.

Figure 20:
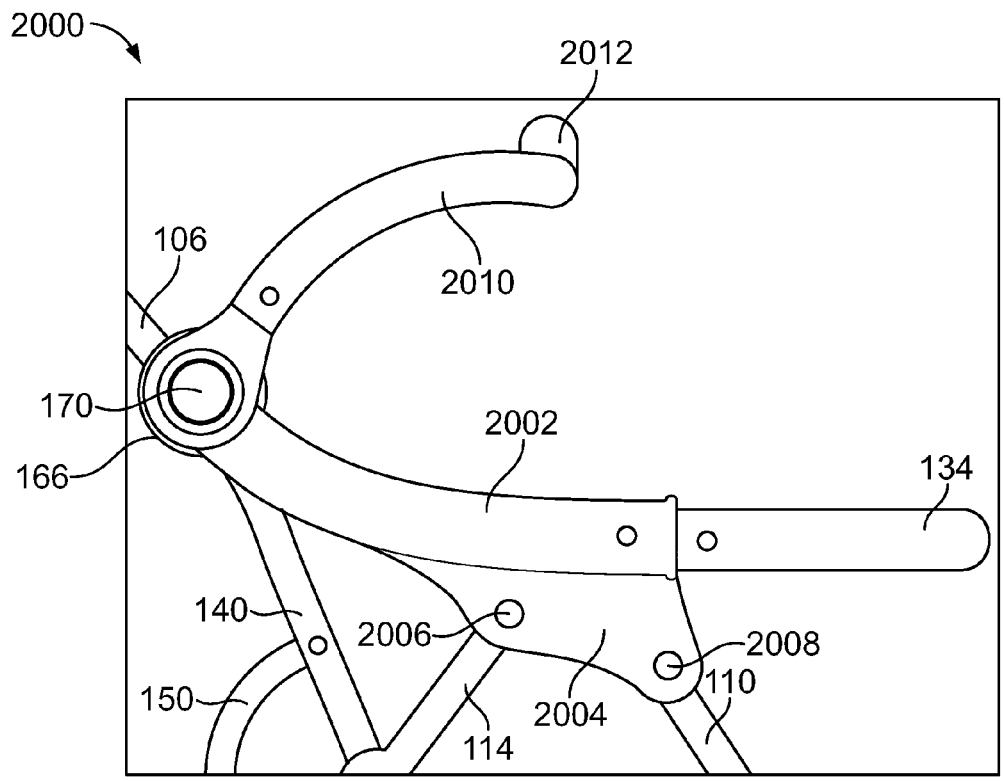
FIG. 20 illustrates still another example child car seat carrier and security bar.

FIG. 20 shows yet another example child car seat carrier 2000. The example child car seat carrier 2000 includes an example curved side bar 2002 with a forward section 2004 including a lower, scalloped profile. The forward section 2004 includes a first pivot point 2006 and a second pivot point 2008 for the rear leg 114 and front leg 110, respectively. The example child car seat carrier 2000 also includes an example security bar 2010 including a bent or raised central portion 212.

Figure 21:
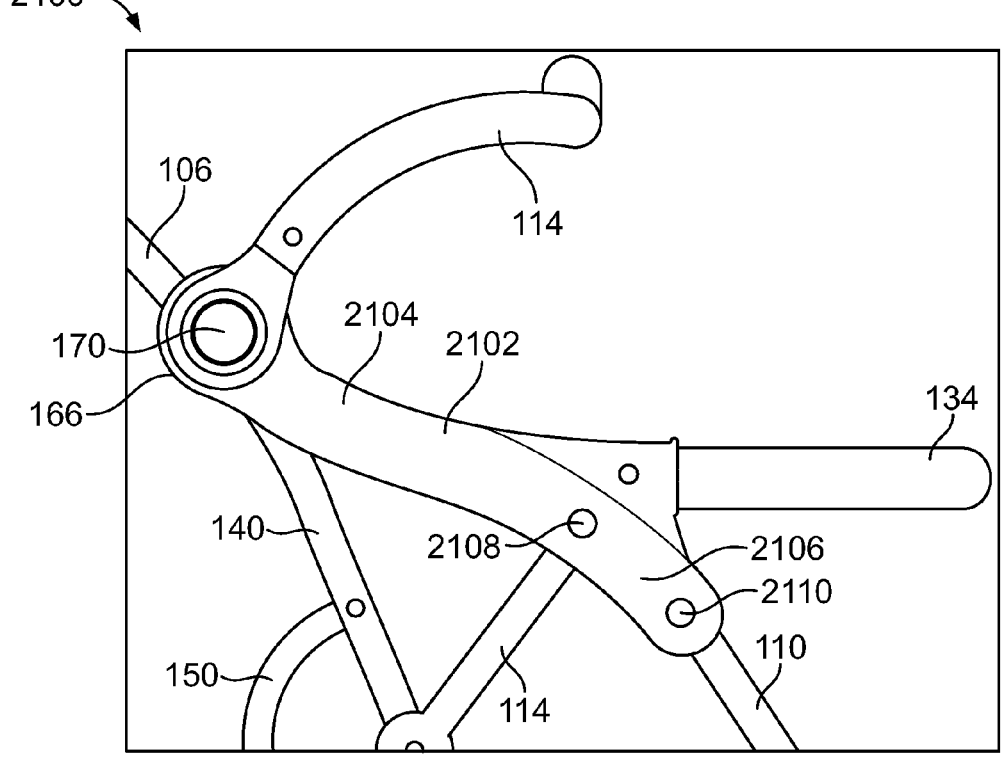
FIG. 21 illustrates yet another example child car seat carrier and security bar.

FIG. 21 illustrates another example child car seat carrier 2100. The example child car seat carrier 2100 of FIG. 21 has a side bar 2102 that includes a first concave portion 2104 and a second concave portion 2106. The first concave portion 2104 and the second concave portion 2106 are oriented such that the second concave portion 2106 opens in a direction opposite the first concave portion 2104. In addition, the second concave portion 2106 includes a first pivot point 2108 and a second pivot point 2110 for the rear leg 114 and front leg 110, respectively.

Example methods of operating the example child car seat carriers 100, 1300, 1800, 1900, 2000, and 2100 are described herein. For example, the example child car seat 500 is placed in the example child car seat carrier 100 such that the child car seat 500 spans a width between the first side bar 126 and the second side bar 128 and engages the napper bar 134. To secure the child car seat 500 to the example child car seat carrier 100, the caregiver moves the security bar 164 downward (in the direction of the Arrow A, FIG. 1) to secure the security bar 164 against (or just above) the child car seat 500 in a position which prevents the child car seat 500 from being removed (e.g., intentionally or accidentally through bumping) from the example child car seat carrier 100. When the security bar 164 is pushed downward, the teeth 1102 of the first gear 1100 are rotated about the security bar joints 166 and 168 and against the teeth 1006 of the second gear 1004, which creates a racing or ratcheting noise. The security bar 164 is prevented from moving toward the raised or open position (without further action by the user, as disclosed herein). To release or raise the security bar 164, the user or caregiver actuates or depresses the release buttons 170 and 172 on the security bar joints 166 and 168 (in the direction of the Arrows B, FIG. 1), which pushes the second gear 1004 against the force of the spring 1016 to disengage the second gear 1004 from the first gear 1100. The disengagement of the teeth or ridges 1102 of the first gear 1100 from the teeth 1006 of the second gear 1004 allows the security bar 164 to be freely rotated upward (in the direction of the Arrow C, FIG. 9) to permit unobstructed access to child car seat 500 and facilitate removal of the child car seat 500 from the example child car seat carrier 100.

Although example apparatus and methods have been described herein, the scope of coverage of this patent is not limited thereto. On the contrary, this patent covers all methods, apparatus and articles of manufacture fairly falling within the scope of this patent either literally or under the doctrine of equivalents.

What is claimed is:

1. A child car seat carrier comprising:
   a frame;
   a first bar carried by the frame to support a bottom of a car seat;
   a second bar to be positioned above the car seat to secure the car seat to the frame between the first bar and the second bar; and
   a joint to couple the second bar to the frame, the joint to enable the second bar to be positioned in a plurality of positions between a first position and a second position, the joint including a one way lock and an actuator; the one way lock to enable movement of the second bar toward the second position without actuation of the actuator, but to prevent movement of the second bar toward the first position without actuation of the actuator.

2. The child car seat carrier as defined in claim 1, wherein the second bar extends across a width of the frame.

3. The child car seat carrier as defined in claim 1, wherein the frame is dimensioned to receive the car seat.

4. The child car seat carrier as defined in claim 1, wherein the joint comprises a first gear and a second gear.

5. The child car seat carrier as defined in claim 4, wherein actuation of the actuator is to cause disengagement of the first gear and the second gear.

6. The child car seat carrier as defined in claim 1, wherein the frame includes a pair of folding joints to fold the frame.

7. The child car seat carrier of claim 6, wherein the joint of the second bar is coupled to one of the folding joints.

8. The child car seat carrier of claim 1, wherein
   the joint comprises a ratcheting joint; and the actuator comprises
   a manual actuator.

9. The child car seat carrier as defined in claim 8, wherein the joint comprises a first gear and a second gear.

10. The child car seat carrier as defined in claim 9, wherein actuation of the actuator is to cause disengagement of the first and second gears.

11. The child car seat carrier as defined in claim 8, wherein opposite ends of the second bar are pivotably coupled to opposite sides of the frame.

12. The child car seat carrier as defined in claim 11, wherein the ratcheting joint is a first ratcheting joint and further comprising a second ratcheting joint, the first ratcheting joint pivotably coupling a first of the ends of the second bar to the frame and the second ratcheting joint pivotably coupling a second of the ends of the second bar to the frame.

13. The child car seat carrier as defined in claim 1, wherein the second bar is to move to a third position between the first position and the second position to secure a first type of car seat and to rotate to a fourth position to secure a second type of car seat different than the first type, the fourth position being different than the third position and between the first position and the second position.

14. The child car seat carrier as defined in claim 1, wherein the child car seat carrier is movable between an operating position and a closed storage position, the second bar to move toward the first position when the child car seat carrier moves to the closed storage position.

15. A child car seat carrier, comprising:
   a frame to support a child car seat;
   a joint supported by the frame, the joint including a first gear and a second gear, the second gear urged into engagement with the first gear by a biasing element, engagement of the gears to prevent rotation of a first one of the first and second gears in a first direction about an axis of rotation while permitting rotation of the first one of the first and second gears in a second direction opposite the first direction;
   a release button associated with the joint to selectively cause the disengagement of the first and second gears to enable rotation of the first one of the first and second gears in the first direction; and
   a bar coupled to the first one of the first and second gears for movement therewith, wherein the bar is to rotate in the second direction to secure the child car seat to the frame.

16. The child car seat carrier as defined in claim 15, wherein the first one of the first and second gears is moveable along the axis of rotation.

17. The child car seat carrier as defined in claim 16, wherein the first one of the first and second gears includes teeth, each of the teeth including a camming surface and a locking surface, the locking surfaces being substantially parallel to the axis of rotation.

18. The child car seat carrier as defined in claim 17, wherein the locking surfaces of the teeth of the first one of the first and second gears are positioned to engage locking surfaces of teeth of a second of the first and second gears to prevent the rotation in the first direction about the axis of rotation.

19. The child car seat carrier as defined in claim 17, wherein rotation of the first of the first and second gears in the second direction is to cause the camming surfaces of the teeth of the first of the first and second gears to urge the second of the first and second gears away from the first of the first and second gears along the axis of rotation to enable the rotation of the first and second gears in the second direction.

20. The child car seat carrier as defined in claim 15, wherein the bar extends across a width of the frame.

21. The child car seat carrier as defined in claim 15, wherein the frame includes a pair of folding joints to fold the frame.

22. The child car seat carrier of claim 21, wherein the joint is coupled to one of the folding joints.

* * * * *